(12) United States Patent
Arimura et al.

(10) Patent No.: US 8,917,766 B2
(45) Date of Patent: Dec. 23, 2014

(54) PICTURE CODING APPARATUS, PICTURE CODING METHOD AND VIDEO CAMERA

(75) Inventors: Koji Arimura, Osaka (JP); Kenjiro Tsuda, Osaka (JP); Tatsuro Juri, Osaka (JP); Yasuharu Tanaka, Osaka (JP); Yoshimitsu Sasaki, Kyoto (JP); Shinji Kitamura, Kyoto (JP)

(73) Assignee: Panasonic Corporation, Osaka (JP)

( * ) Notice: Subject to any disclaimer, the term of this patent is extended or adjusted under 35 U.S.C. 154(b) by 660 days.

(21) Appl. No.: 12/749,860

(22) Filed: Mar. 30, 2010

(65) Prior Publication Data

US 2011/0001839 A1 Jan. 6, 2011

(30) Foreign Application Priority Data

Jul. 1, 2009 (JP) ................................. 2009-156694

(51) Int. Cl.
| | |
|---|---|
| H04N 11/02 | (2006.01) |
| G06K 9/36 | (2006.01) |
| H04N 11/04 | (2006.01) |
| H04N 19/172 | (2014.01) |
| H04N 19/102 | (2014.01) |
| H04N 19/137 | (2014.01) |
| H04N 19/139 | (2014.01) |
| H04N 19/597 | (2014.01) |

(52) U.S. Cl.
CPC ....... *H04N 7/26271* (2013.01); *H04N 7/26015* (2013.01); *H04N 7/26132* (2013.01); *H04N 7/26138* (2013.01); *H04N 19/00769* (2013.01)
USPC ................ 375/240.13; 382/232; 375/240.16; 375/240.12

(58) Field of Classification Search
None
See application file for complete search history.

(56) References Cited

U.S. PATENT DOCUMENTS

| | | | |
|---|---|---|---|
| 5,317,397 | A | 5/1994 | Odaka et al. |
| 5,424,779 | A | 6/1995 | Odaka et al. |
| 5,467,136 | A | 11/1995 | Odaka et al. |
| 5,479,264 | A | 12/1995 | Ueda et al. |
| 5,488,482 | A | 1/1996 | Ueda et al. |
| 5,541,661 | A | 7/1996 | Odaka et al. |
| 5,647,049 | A | 7/1997 | Odaka et al. |
| 5,742,344 | A | 4/1998 | Odaka et al. |
| 5,754,231 | A | 5/1998 | Odaka et al. |
| 5,841,474 | A | 11/1998 | Ueda et al. |

(Continued)

FOREIGN PATENT DOCUMENTS

| | | |
|---|---|---|
| EP | 1 933 570 | 6/2008 |
| JP | 05-130590 | 5/1993 |

(Continued)

*Primary Examiner* — Joseph Ustaris
*Assistant Examiner* — Frederick Bailey
(74) *Attorney, Agent, or Firm* — Wenderoth, Lind & Ponack, L.L.P.

(57) ABSTRACT

A picture coding apparatus includes a static area information calculating unit that calculates static area information indicating a size of a static area of which motion is smaller than a predetermined value for each of fields included in an interlaced picture, a reference field selecting unit that selects, as a reference field to be used to predict a field to be coded, one of a field having of the same parity as a field to be coded and a field having the opposite parity of the field to be coded, among fields previously coded, based on the static area information of the fields previously coded, and a coding unit that codes the field to be coded by using the reference field selected by the reference field selecting unit.

12 Claims, 10 Drawing Sheets

(56) References Cited

U.S. PATENT DOCUMENTS

| | | |
|---|---|---|
| 5,909,252 A | 6/1999 | Ueda et al. |
| 5,986,713 A | 11/1999 | Odaka et al. |
| 6,005,627 A | 12/1999 | Odaka et al. |
| 6,016,162 A | 1/2000 | Odaka et al. |
| 6,870,884 B1 | 3/2005 | Ueda et al. |
| 2002/0006163 A1* | 1/2002 | Hibi et al. ............... 375/240.16 |
| 2002/0034252 A1* | 3/2002 | Owen et al. .............. 375/240.17 |
| 2002/0041698 A1* | 4/2002 | Ito et al. ........................ 382/103 |
| 2002/0044692 A1 | 4/2002 | Goertzen |
| 2003/0021483 A1 | 1/2003 | Goertzen |
| 2003/0133501 A1 | 7/2003 | Ueda et al. |
| 2003/0138044 A1 | 7/2003 | Ueda et al. |
| 2004/0021775 A1* | 2/2004 | Kondo et al. ............ 348/207.99 |
| 2004/0136599 A1* | 7/2004 | Kadowaki ................... 382/232 |
| 2005/0053134 A1* | 3/2005 | Holcomb .................. 375/240.12 |
| 2006/0133487 A1 | 6/2006 | Ueda et al. |
| 2008/0069208 A1 | 3/2008 | Ueda et al. |
| 2008/0069224 A1 | 3/2008 | Ueda et al. |
| 2008/0112482 A1 | 5/2008 | Ueda et al. |
| 2008/0123746 A1 | 5/2008 | Ueda et al. |
| 2008/0232473 A1* | 9/2008 | Marquant et al. ........ 375/240.16 |
| 2008/0285650 A1* | 11/2008 | Chappalli ................ 375/240.16 |
| 2009/0116555 A1* | 5/2009 | Oishi ....................... 375/240.16 |
| 2009/0135270 A1* | 5/2009 | Makino et al. ............. 348/222.1 |
| 2009/0244093 A1* | 10/2009 | Chen et al. ..................... 345/620 |

FOREIGN PATENT DOCUMENTS

| | | | |
|---|---|---|---|
| JP | 5-304664 | | 11/1993 |
| JP | 6-339135 | | 12/1994 |
| JP | 8-9388 | | 1/1996 |
| JP | 2006-94454 | | 4/2006 |
| JP | 2007-259206 | | 10/2007 |
| JP | 2008-11117 | | 1/2008 |
| JP | 2008-011117 | * | 1/2008 |
| WO | 2007/040197 | | 4/2007 |

* cited by examiner

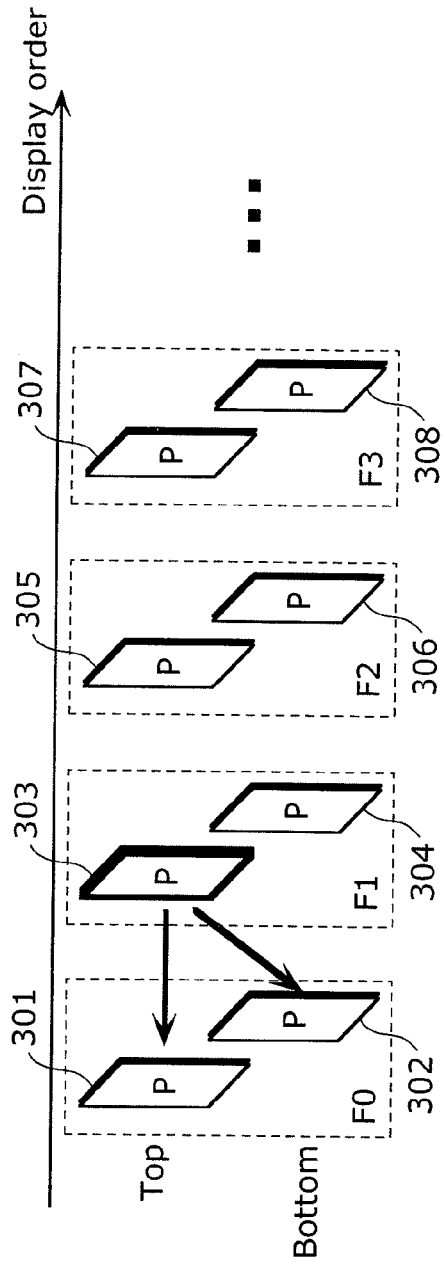
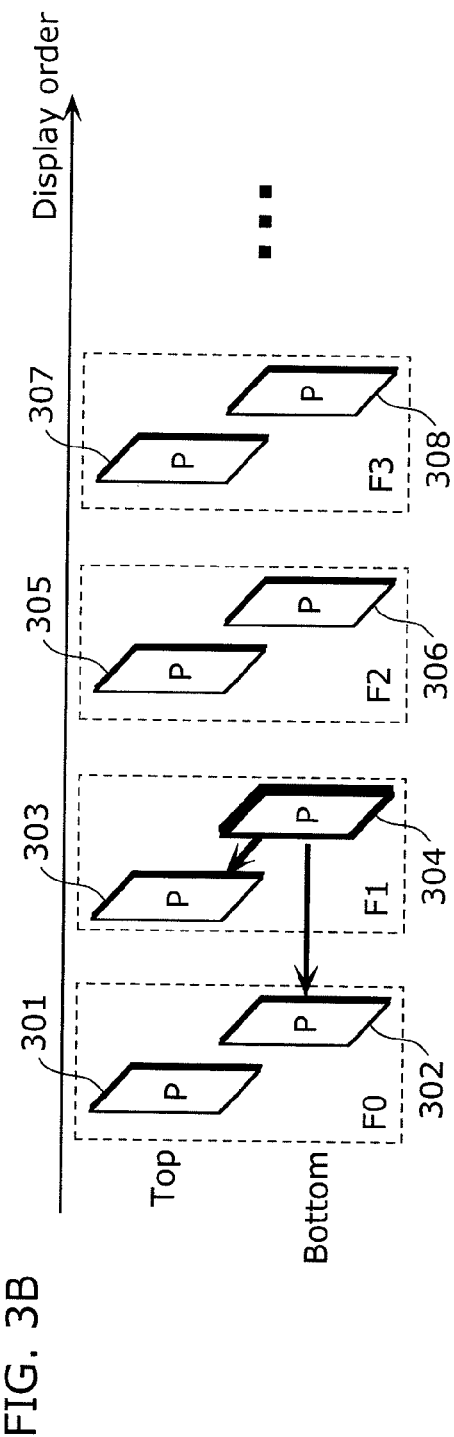
FIG. 3A
FIG. 3B

PICTURE CODING APPARATUS, PICTURE CODING METHOD AND VIDEO CAMERA

BACKGROUND OF THE INVENTION (1) Field of the Invention

The present invention relates to picture coding that corresponds to motion prediction field coding of an interlaced-picture signal.

(2) Description of the Related Art

In recent years, two methods called progressive video and interlaced video have been used as an uncompressed picture data format. In the progressive video, all of the sample lines for a frame are composed of sample lines with the same time. On the other hand, in the interlaced video, the sample lines for a frame are composed of sample lines with alternatingly different times. A picture signal in the interlaced video is provided in a way that one frame consists of a top field and a bottom field compiled on sample line basis.

Since the above uncompressed picture data is a large data volume, it is general that the data is compressed and recorded by using a coding method such as MPEG2 or H.264/MPEG4-AVC. In the coding method such as MPEG2 or H.264/MPEG4-AVC, a motion vector between frames having different time is detected and an inter picture coding process through motion compensation prediction is used. Also, it has two modes: frame coding that codes through inter picture motion prediction by each frame; and field coding that codes through inter picture motion prediction by each field.

Furthermore, in the H.264/MPEG4-AVC method, it is possible to select a reference frame from a plurality of frames and compensate its motion. For example, in a case of the field coding, it is possible to select which field, a top field or a bottom field, is referred from fields previously coded.

When a reference field is selected like this, it is possible to select one with higher coding efficiency and better picture quality as after motions of all possible fields are detected as a candidate and coded. However, there is an issue that this method requires a large amount of processing volume.

As a conventional example to solve a problem like this, there are Patent Reference 1 (see Japanese Unexamined Patent Application Publication No. 2006-94454 referred to as Patent Reference 1 hereinafter) and Patent Reference 2 (see Japanese Unexamined Patent Application Publication No. 2007-259206 referred to as Patent Reference 2 hereinafter). In the Patent Reference 1 and the Patent Reference 2, a moving picture coding apparatus that selects a reference field based on a size of motions moving between fields (a motion vector in an entire image through a compressed picture, an average value of the motion vector, an average value of absolute values of the motion vector, and so on) is suggested. Also, in Patent Reference 3 (see Japanese Unexamined Patent Application Publication No. 2008-11117 referred to as Patent Reference 3 hereinafter), it discloses a reference picture decision method that selects a reference field based on a correlation between fields in addition to the size of motions between fields. Furthermore, in Patent Reference 4 (see International Publication No. 2007/040197 referred to as Patent Reference 4 hereinafter), as a decision criteria for a reference field selection, it discloses a reference field selection method that presumes a size of motions from a motion vector based on an compressed picture, a ratio of an intra-coded macroblock, and so on, and that selects a reference field based the size of the presumed motion.

In the conventional reference field selection method, a reference field is selected by using a size of motions predicted by each field (by each picture) as a decision criterion. Because of this, there is an issue that, even if a background of a picture to be coded remains static and some object partially moves substantially, it is decided that there is a movement as an average motion by each field so that a reference field is undesirably selected based on the concerned decision result.

In addition, when an object in a lower portion of an image moves substantially on a static background, coding efficiency and picture quality of a part having a movement on the lower portion of the image are optimized but coding efficiency and picture quality of a static area on an upper portion of the image are downgraded. There is an issue that deteriorated picture quality becomes remarkable in the entire image because it is easier to detect a distortion in the static area than the moving area.

SUMMARY OF THE INVENTION

The present invention is conceived in view of the aforementioned problem and has as an object to provide a picture coding apparatus that restrains deterioration of picture quality and improves coding efficiency.

The picture coding apparatus according to an embodiment of the present invention codes an interlaced picture. To be specific, the picture coding apparatus includes: a static area information calculating unit configured to calculate static area information indicating a size of a static area of which motion is smaller than a predetermined value for each of fields included in the interlaced picture; a reference field selecting unit configured to select, as a reference field to be used to predict a field to be coded, one of a field having a same parity as the field to be coded and a field having an opposite parity of the field to be coded, among fields previously coded, based on the static area information of the fields previously coded; and a coding unit configured to code the field to be coded by using the reference field selected by the reference field selecting unit.

As in the structure above, by selecting a reference field based on a size of a static area, for example, it is possible to improve coding efficiency without degrading picture quality even if a large portion of a picture remains static and only a part of it moves substantially.

In addition, the reference field selecting unit may be configured to select the field having of the same parity as the field to be coded as the reference field when the size of the static area indicated in the static area information is equal to or bigger than a threshold value. If the static area is large (meaning that a large portion of the picture stays static), it is possible to gain high efficiency by selecting the field in the same parity as a reference field.

Moreover, the reference field selecting unit may be configured to select the field having the opposite parity of the field to be coded as the reference field when the size of the static area indicated in the static area information is smaller than the threshold value. On the other hand, if the static area is small (meaning that a large portion of the picture is moving), it is possible to gain high efficiency by selecting the field in an opposite parity of which temporal distance is close.

Also, the reference field selecting unit is configured to select the reference field among the fields previously coded, based on static area information of a field of which temporal distance is closest to the field to be coded. Through use of static area information of a field of which temporal distance is close to a field to be coded, it is possible to make a decision on a characteristic feature (information related to a motion) of a field to be coded in a more accurate manner.

As one embodiment, the reference field selecting unit may be configured to select the reference field among the fields previously coded, based on static area information of a field having the same parity as the field to be coded. As another embodiment, the reference field selecting unit may be configured to select the reference field among the fields previously coded, based on static area information of the field having the opposite parity of the field to be coded.

Also, the static area information calculating unit may be configured to calculate, as the static area information, the number of static macroblocks of which a size of a motion vector is equal to or smaller than a first threshold value, among a plurality of macroblocks included in a field. By doing so, it is possible to improve efficiency without deteriorating picture quality even if, for example, a large portion of a picture stays static and only a part of it moves significantly.

Furthermore, the static area information calculating unit may be configured to further calculate the number of dynamic macroblocks of which each size of a motion vector is equal to or bigger than a second threshold value, which is bigger than the first threshold value, among the plurality of the macroblocks included in a field, and, as the static area information, calculate a ratio of the number of the static macroblocks to the number of the dynamic macroblocks. By doing so, it is possible to make a more accurate decision of a static area rather than making a decision only with the number of static macroblocks.

In addition, the static area information calculating unit may be configured to provide a higher first threshold value for a greater temporal distance between a field for calculating the static area information and a reference field of the field for which the static area information is calculated. In general, a volume of motions becomes smaller for pictures of which temporal distance is closer so that it is desirable to increase the first threshold value if a field having a greater temporal distance from the calculation field is used as a reference field.

Furthermore, the picture coding apparatus may further include an area dividing unit configured to divide each field included in the interlaced picture into a plurality of partial fields, wherein the static area information calculating unit calculates the static area information by each of the partial fields; the reference field selecting unit selects the reference field by each of the partial fields of the field to be coded; and the coding unit codes the field to be coded by each of the partial fields. As one of the embodiments, the partial field may be a slice specified in a coding standard.

As stated above, by making a decision based on a size of a motion vector by each area of a picture according to a slice division, etc. rather than a size of a motion vector by each field (by each picture), it is possible to select a most optimum reference field by each area. As a result of it, it becomes possible to further improve coding efficiency as well as picture quality compared with the conventional examples.

A picture coding method of coding an interlaced picture according to an embodiment of the present invention is a method for coding an interlaced picture. To be specific, the picture coding method includes steps of: calculating static area information indicating a size of a static area of which motion is smaller than a predetermined value by each field included in the interlaced picture; selecting, as a reference field to be used to predict a field to be coded, one of a field having a same parity as the field to be coded and a field having an opposite parity of the field to be coded, among fields previously coded, based on the static area information of the fields previously coded; and coding the field to be coded by using the reference field selected in the selecting.

A video camera according to an embodiment of the present invention codes an imaged interlaced picture. To be specific, the video camera includes: an imaging unit configured to image the interlaced picture; a static area information calculating unit configured to calculate static area information indicating a size of a static area of which motion is smaller than a predetermined value for each of fields included in the interlaced picture; a reference field selecting unit configured to select, as a reference field to be used to predict a field to be coded, one of a field having a same parity as the field to be coded and a field having an opposite parity of the field to be coded, among fields previously coded, based on the static area information of the fields previously coded; and a coding unit configured to code the field to be coded by using the reference field selected by the reference field selecting unit.

According to above structure, it is possible to improve accuracy in a decision of a static condition, and to enhance coding efficiency as well as picture quality compared with conventional examples.

Further Information about Technical Background to this Application

The disclosure of Japanese Patent Application No. 2009-156694 filed on Jul. 1, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3A is a diagram that shows a reference structure when a to be coded is a top field and a P picture;

FIG. 3B is a diagram that shows a reference structure when a to be coded is a bottom field and the P picture;

DESCRIPTION OF THE PREFERRED EMBODIMENTS

The following describes embodiments of the present invention with reference to the Drawings.

(First Embodiment)

The following describes a first embodiment with reference to diagrams.

This first embodiment is described based on a supposition that each field composing of an interlaced picture is entered sequentially.

Figure 1:
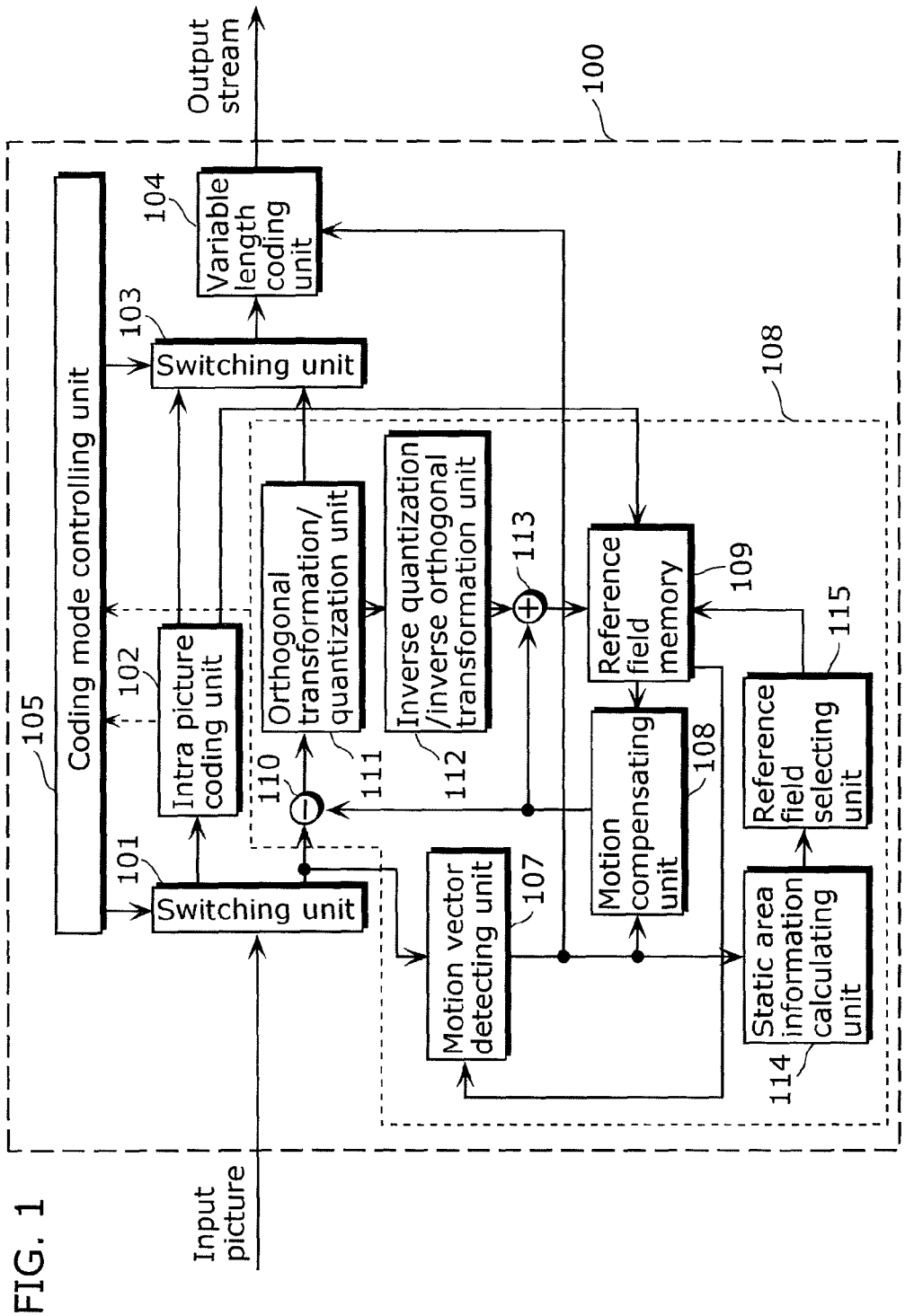
FIG. 1 is a block diagram that shows a picture coding apparatus according to a first embodiment of the present invention.

FIG. 1 is a schematic diagram that shows a picture coding apparatus 100 according to the first embodiment of the present invention. The picture coding apparatus 100 includes switching units 101, 103, an inter picture coding unit 106, an intra picture coding unit 102, a coding mode controlling unit 105 and a variable length coding unit 104.

The switching unit 101 switches an output destination of an input field input by a type of the concerned field based on control information from the coding mode controlling unit 105. To be specific, if the input field is coded as I picture, it is output to the intra picture coding unit 102. On the other hand, if the input field is coded as P picture or B picture, it is output to both of the intra picture coding unit 102 and the inter picture coding unit 106.

The intra picture coding unit 102 generates a prediction picture that corresponds to a field to be coded currently among input fields output from the switching unit 101 by using intra-prediction. Moreover, it generates a differential picture, which is a difference between the generated prediction picture and the input field, and generates quantization coefficient information by orthogonally transforming and quantizing the concerned differential picture. Then, it outputs the quantization coefficient information to the switching unit 103 as well as inverse quantizing the concerned quantization coefficient information, and outputs a local decode picture, which is acquired by inverse orthogonal transformation, to a reference field memory 109. Moreover, it also outputs coding mode decision information, which becomes necessary to decide a coding mode such as a sum of differential absolute values generated during the intra-prediction, to the coding mode controlling unit 105.

Based on decision information from the coding mode controlling unit 105, the switching unit 103 selects one of quantization coefficient information, which is output from the intra picture coding unit 102 and the inter picture coding unit 106, and outputs to the variable length coding unit 104.

Based on decision information output from the coding mode controlling unit 105 and motion vector information output from the motion vector estimating unit 107, the variable length coding unit 104 executes variable length coding of the quantization coefficient information output from the switching unit 103 and outputs as an output stream.

The coding mode controlling unit 105 outputs a control signal to the switching unit 101 in a way an input picture is output only to the intra picture coding unit 102 in a case of the I picture, and output to both of the intra picture coding unit 102 and the inter picture coding unit 106 in a case of the P picture or the B picture. In addition, the coding mode controlling unit 105 outputs decision information to decide a coding mode for the switching unit 103 and the variable length coding unit 104 based on coding mode decision information output from the inter picture coding unit 106 and the intra picture coding unit 102.

For an input field output from the switching unit 101, the inter picture coding unit 106 conducts inter prediction and generates a prediction picture by using a reference field selected based on information related to a static area of the concerned input field. Furthermore, it generates a differential picture, which is a difference between the generated prediction picture and the input field, and generates quantization coefficient information by orthogonally transforming and quantizing the concerned differential picture. Then, the generated quantization coefficient information is output to the switching unit 103. More specific operations of the inter picture coding unit 106 are described later. Also, the coding mode decision information, which becomes necessary for deciding a coding mode such as a sum of differential absolute values generated during inter prediction, is output to the coding mode controlling unit 105.

Next, the inter picture coding unit 106 is described specifically. The inter picture coding unit 106 includes the motion vector estimating unit 107, a motion compensating unit 108, the reference field memory 109, the subtractor 110, an orthogonal transformation/quantization unit 111, an inverse quantization/inverse orthogonal transformation unit 112, the adder 113, the static area information calculating unit 114 and a reference field selecting unit 115.

The motion vector estimating unit 107 generates motion vector information based on an input field output from the switching unit 101 and local decode picture accumulated in the reference field memory 109. The generated motion vector information is output to the static area information calculating unit 114, the motion compensating unit 108, and the variable length coding unit 104.

Based on the motion vector information output from the motion vector estimating unit 107, the motion compensating unit 108 compensates motions and generates a prediction picture by using a local decode picture corresponding to a field to be coded currently, which is accumulated in the reference field memory 109. The generated prediction picture is output to the subtractor 110 and the adder 113. If a local decode picture is selected from the reference field memory 109, it is structured to select it based on a selection signal output from the reference field selecting unit 115.

The reference field memory 109 accumulate the local decode picture output from the intra picture coding unit 102 and the adder 113. Then, based on the selection signal from the reference field selecting unit 115, it outputs a local decode picture to the motion compensating unit 108.

The subtractor 110 calculates a differential picture as a result of a difference between an input field output from the switching unit 101 and a prediction picture output from the motion compensating unit 108, and outputs to the orthogonal transformation/quantization unit 111.

The orthogonal transformation/quantization unit 111 generates quantization coefficient information by orthogonally transforming and quantizing the differential picture output from the subtractor 110. The generated quantization coefficient information is output to the switching unit 103 and the inverse quantization inverse orthogonal unit 112.

The inverse quantization/inverse orthogonal transformation unit 112 conducts inverse quantization to quantization coefficient information output from the orthogonal transformation/quantization unit 111, and decodes the differential picture through inverse orthogonal transformation. Then, it outputs the concerned differential picture to the adder 113.

The adder 113 adds the differential picture output from the inverse quantization/inverse orthogonal transformation unit 112 and the prediction picture output from the motion compensating unit 108, and generates a local decode picture. The generated local decode picture is output to the reference field memory 109.

The static area information calculating unit 114 calculates static area information related to a static area in the concerned field based on motion vector information output from the motion vector estimating unit 107 when a field is coded. Then, the static area information calculating unit 114 outputs the calculated static area information to the reference field selecting unit 115. This static area information is used to select a reference field when a subsequent field is coded. Here, as the information related to the static area, any information may be used as long as the information is related to the static area such as, for example, a ratio of the static area to an entire field to be coded, the number of static areas, and so on. Hereinafter, as the static area information, information regarding a size of the static area of which motion is smaller than a predetermined value is used.

The static area information calculating unit 114 may count, for example, the number of macroblocks (static macroblock) of which motion vector is zero or equal to or smaller than a predetermined threshold value Th_mv, and treats this number of the macroblocks as static area information.

To be more specific, the static area information calculating unit 114 compares absolute values of x element and y element of motion vectors (x, y) in a field to be coded with a threshold value Th_mv set as an option. Then, it is structured to set it as a static macroblock if it is |x|<=Th_mv and |y|<=Th_mv.

Here, there is a case that a macroblock may have plural motion vectors. In such a case, the macroblock of which motion vectors are all smaller than a predetermined threshold value Th_mv is set as a static macroblock. It is preferable that the threshold value Th_mv is either zero or a sufficiently small number, for example, 1 (integer accuracy).

However, if the threshold value Th_mv is not zero, it is corrected by a temporal difference between a field to be coded and a reference field. For example, when a threshold value in a case of a field where a field to be coded and a reference field are continued in a reproduction order is Th_mv, the threshold value is set as Th_mv*2 if the field to be coded is two fields away from the reference field. In short, the threshold value Th_mv can be increased as the temporal distance between a field to be coded and a reference field is greater.

Based on the static area information of fields previously coded, the reference field selecting unit 115 selects a reference field of a field, which is coded from now, from local decode pictures held in the reference field memory 109. To be more specific, if there are many static areas, the reference field selecting unit 115 selects a field which has the same parity as a field to be coded (hereinafter referred to as "a field having the same parity"). On the other hand, if there are not many static areas, it selects a field having the opposite parity of a field to be coded (hereinafter referred to as "a field having the opposite parity").

In short, with using a characteristic of a moving picture that fields, of which temporal distance is closer, resembles each other, the reference field selecting unit 115 deems the static area information of fields previously coded as the static area information of the field to be coded, and selects a reference field. For doing so, it is desirable for the reference field selecting unit 115 to select the reference field based on static area information of the field having the same parity as the field to be coded and is coded just before the concerned field in a reproduction order. However, it is also possible to select the reference field based on static area information of fields previously coded even before the field mentioned above.

With reference to FIG. 2A, FIG. 2B, FIG. 3A and FIG. 3B, here explains which field of static area information is used when the reference field selecting unit 115 selects a reference field.

Figure 2A:
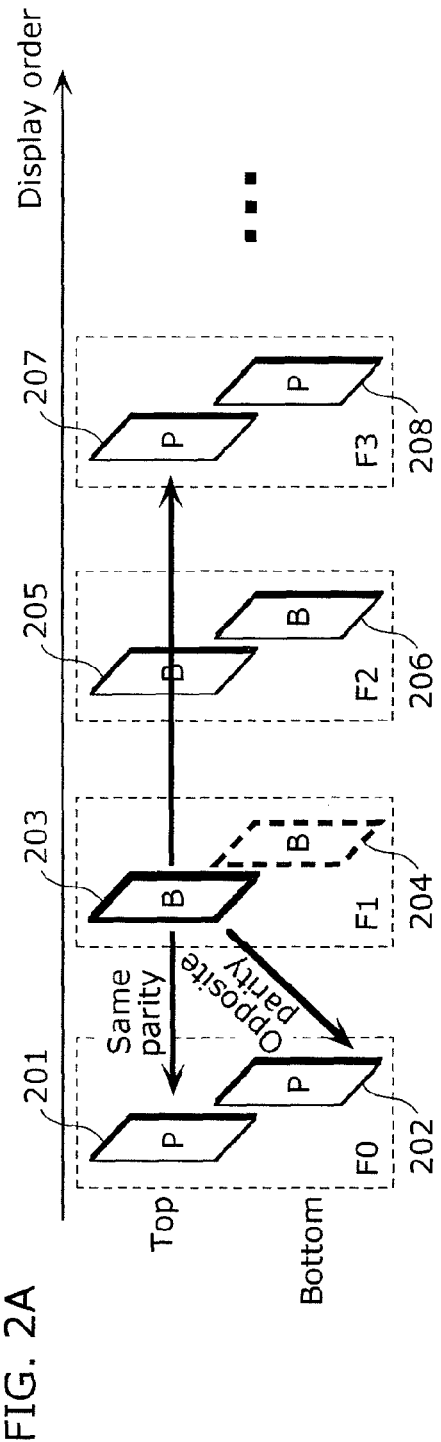
FIG. 2A is a diagram that shows a reference structure when a to be coded is a top field and a B picture.
Figure 2B:
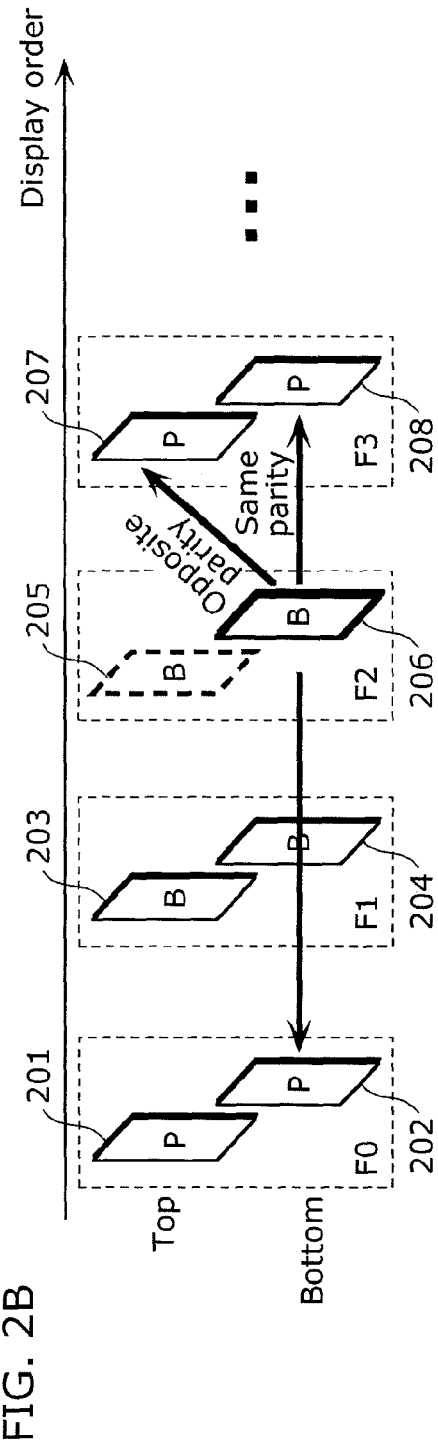
FIG. 2B is a diagram that shows a reference structure when a to be coded is a bottom field and the B picture.

FIG. 2A and FIG. 2B are diagrams that shows a reference structure when the B picture is to be coded among fields that forms an interlaced picture. Here, the B picture is coded by using a forward reference field and a backward reference field.

If a field to be coded is a top field 203 in a F1 frame, in order to execute coding, a top field 207 in a F3 frame is selected as a reference field for a backward reference, and either of the fields, a top field 201 or a bottom field 202 in a F0 frame is selected as a reference field for a forward reference.

Also, if a field to be coded is a bottom field 206 in a F2 frame, in order to execute coding, a bottom field 202 in the F0 frame is selected as a reference field for a forward reference, and either of the fields, a top field 207 or a bottom field 208 in the F3 frame is selected as a reference field for a backward reference.

FIG. 3A and FIG. 3B are diagrams that shows a reference structure when the P picture is to be coded among fields forming an interlaced picture. Here, the P picture is supposed to be coded with one field being used as a reference field.

If a field to be coded is a top field 303 in the F1 frame, coding is performed be selecting either of a top field 301 or a bottom field 302 in the F0 frame as a reference field.

Also, if a field to be coded is a bottom field 304 in the F1 frame, either of the fields, a bottom field 302 in the F0 frame or a top field 303 in the F1 frame is selected as a reference field to execute the coding.

For example, if a field to be coded is the top field 203 of the F1 frame of the B picture as shown in FIG. 2A, the reference field selecting unit 115 may select a reference field by using the static area information in the top field 201 of the F0 frame or the top field 207 of the F3 frame, which are previously coded and have the same parity as the field 203. Or it may select a reference field by using the static area information in the bottom field 202 of the F0 frame, which is previously coded and has the opposite parity of the field 203.

Also, if a field to be coded is the bottom field 206 of the F2 frame of the B picture as shown in FIG. 2B, the reference field selecting unit 115 may select a reference field by using the static area information in the top field 205 of the F2 frame or the top field 207 of the F3 frame, which are previously coded and have the opposite parity of the field 206. Or it may select a reference field by using the static area information in the bottom field 204 of the F1 frame or the bottom field 208 of the F3 frame, which are previously coded and have the same parity as the field 206.

In the same way as this, if a field to be coded is the bottom field 303 of the F1 frame of the P picture as shown in FIG. 3A, the reference field selecting unit 115 may select a reference field by using the static area information in the bottom field 302 of the F0 frame, which are previously coded and have the same parity as the field 303. Alternatively, it may select a reference field by using the static area information in the top field 301 of the F0 frame, which is previously coded and has the opposite parity of the field 303.

Moreover, if a field to be coded is the bottom field 304 of the F1 frame of the P picture as shown in FIG. 3B, the reference field selecting unit 115 may select a reference field by using the static area information in the bottom field 302 of the F0 frame, which is previously coded and has the same parity as the field 304. Or it may select a reference field by using the static area information in the top field 303 of the F1 frame, which is previously coded and has the opposite parity of the field 304.

By using the static area information of a field closer to a field to be coded in a reproduction order among fields previously coded, it is possible to make a more accurate static decision of the field to be coded. In short, it is desirable to make a static area decision based on the static area information of the coded field located before and after the field to be coded in the reproduction order. To state further, it is most desirable to make a decision based on the static area information of the field that is closest in the reproduction order among the field previously coded.

However, for conducting the static area decision based on static area information of the coded field closest in the reproduction order, it is necessary to make the decision based on motion vectors of all fields coded so that it has a large volume of arithmetic calculation for decision processes. Therefore, in order to reduce the volume of arithmetic calculation for the static area decision processes, it may conduct calculation of the static area information only for fields at one side of each frame (for example, a top field).

For example, a case for calculating static area information only for top fields is described with reference to FIG. 3A. The static area information of the top field 301 of the F0 frame is calculated, but the static area information of the bottom field 302 is not calculated. Therefore, based on the static area information of the top field 301, the reference fields for both fields, the bottom field 302 of the F0 frame and the top field 303 of the F1 frame are selected.

It should be noted that the static area information calculating unit 114 is structured to acquire information such as a motion vector, etc. used for calculating the static area information from fields previously coded. In this case, it may be structured to include an accumulation unit that accumulates, for example, the number of static macroblocks of which motion vector is either zero or equal to or smaller than a predetermined threshold Th_mv when each field is coded.

Figure 4:
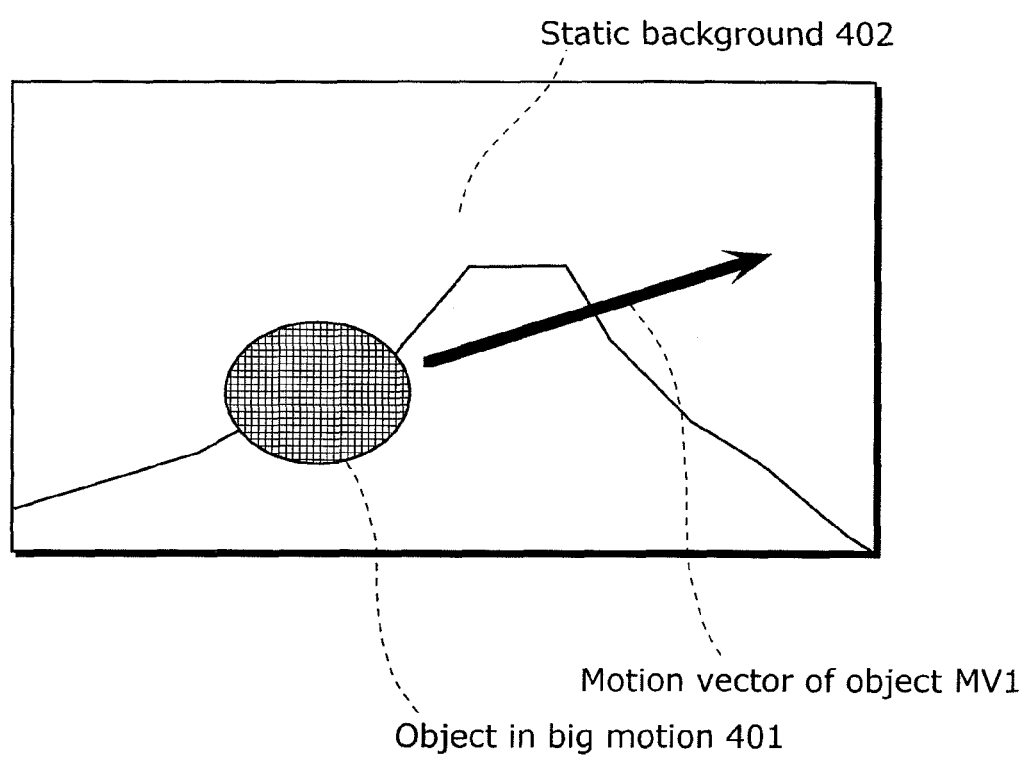
FIG. 4 is a diagram that shows a picture where a part of objects moves substantially in a static background.

According to above structure, as shown in FIG. 4, it is possible to select an appropriate reference field by deciding a picture, which partially contains an object in big motion 401 in a background 402 of which major part stays static, as "a picture having less motions". As its result, it is possible to acquire the picture coding apparatus 100 that especially suppresses deterioration of quality for the static part and improves coding efficiency.

Figure 5:
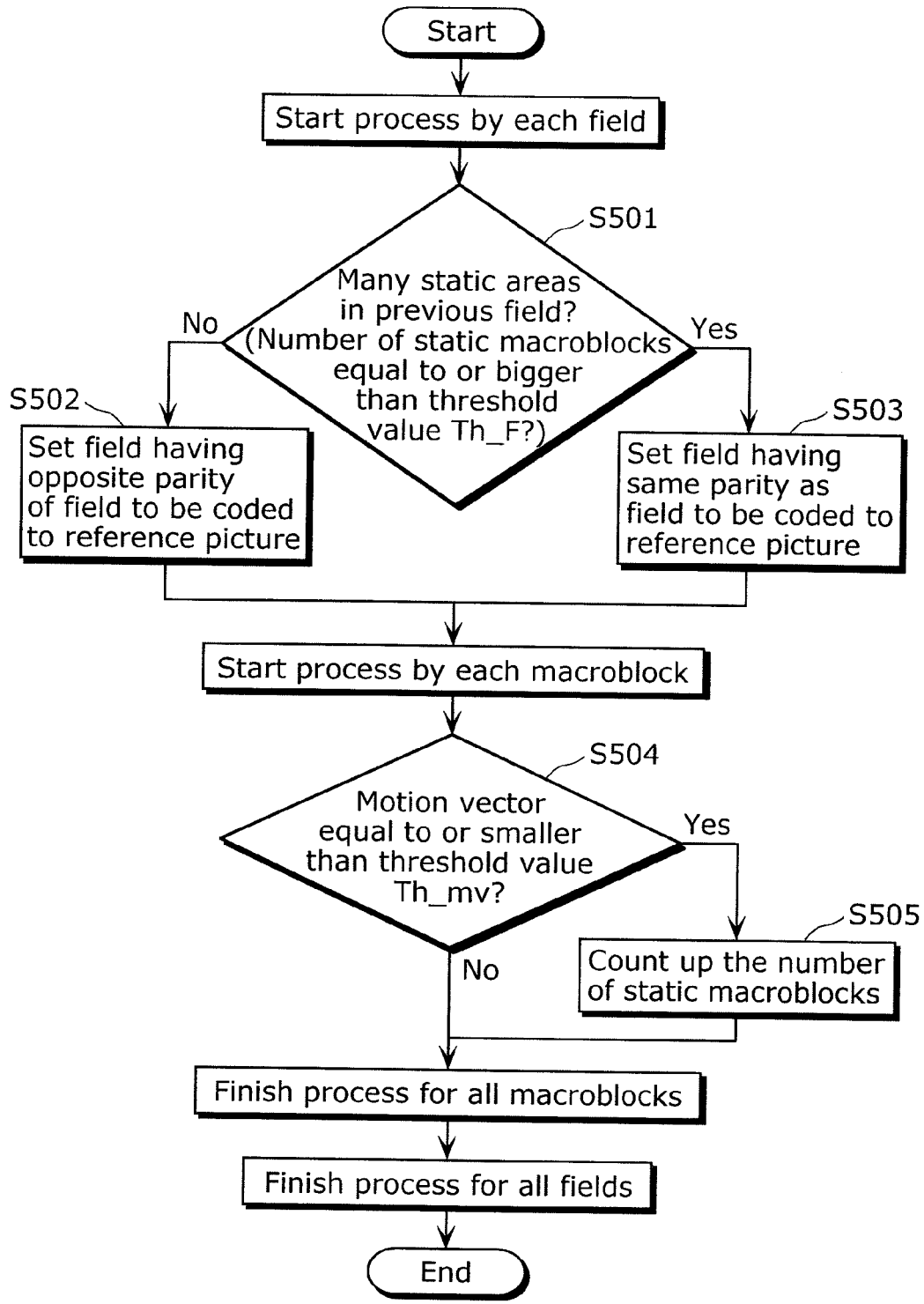
FIG. 5 is a flow chart that shows operations of the picture coding apparatus in the first embodiment.

Next, a flow for a decision process of a reference field and a summing process of static macroblocks according to the first embodiment of the present invention is described with reference to a flow chart in FIG. 5.

First of all, in order to decide a reference field of a field to be coded, the reference field selecting unit 115 decides a size of a static area contained in a field to be coded from whether the number of static macroblocks in the fields previously coded is equal to or bigger than a predetermined threshold Th_F (S501).

If the number of static macroblocks is smaller than the predetermined threshold Th_F (No in S501), it decides the field to be coded is a moving field, meaning that it has less static areas in the field, so that it proceeds to S502. Also, if the number of static macroblocks is bigger than the predetermined threshold Th_F (Yes in S501), it decides the field to be coded is a static field, meaning that it has more static areas in the field, so that it proceeds to S503.

If there are not many static areas in the field, the reference field selecting unit 115 selects a reference field from fields having the opposite parity of the field to be coded (S502). For example, in the FIG. 3A, if a field to be coded is a top field 303 of the F1 frame, it selects the bottom field 302 having the opposite parity of the field to be coded, from the top field 301 and the bottom field 302 of the F0 frame. Typically, a field of which temporal distance is closest to a field to be coded is selected as a reference field among fields having the opposite parity.

On the other hand, if there are many static areas in the field, the reference field selecting unit 115 selects a reference field among fields having the same parity as the field to be coded (S503). For example, in the FIG. 3A, if the field to be coded is the top field 303 of the F1 frame, it selects the top field 301 having the same parity as the field to be coded from the top field 301 and the bottom field 302 of the F0 frame.

Next, the static area information calculating unit 114 calculates static area information of the concerned field while a field to be coded is coded. This static area information is used for a decision of a reference field of a following field to be coded. At first, the static area information calculating unit 114 compares an absolute value of a motion vector estimated by the motion vector estimating unit 107 and a predetermined threshold value Th_mv for each macroblock included in the field to be coded (S504).

Next, if the motion vector is equal to or smaller than the threshold value Th_mv (Yes in S504), the static area information calculating unit 114 decides the concerned macroblock as a static macroblock. Then, it counts the number of the concerned static macroblock by each field (S505). When all of the processes for macroblocks included in the field to be coded are completed, it finishes its operation.

Processes (S501, S502 and S503) executed by the reference field selecting unit 115 are processing steps processed by each field. On the other hand, the processes (S504 and S505) executed by the static area information calculating unit 114 are process procedures processed by each macroblock included in the field.

As mentioned above, the picture coding apparatus 100 compares a motion vector of each macroblock included in a field coded before a field to be coded with a threshold value Th_mv, and counts the number of static macroblocks of which absolute value of motion vector is equal to or smaller than a threshold value Th_mv. Then, based on the value counted, it selects a reference field of a field to be coded. Therefore, it can successfully provide an effect to prevent visual distortion by optimizing to a portion partially having a big motion.

(Second Embodiment)

The first embodiment of the present invention is structured to generate static area information related to a static area for an entire input field and select a reference field according to the concerned static area information. However, because the static area information is generated for the entire input field, it is not possible to appropriately control a field of which characteristic changes significantly by each area if it is for a picture, as shown in the FIG. 4, of which upper half of the field is mainly static and lower half of the field moves remarkably. Therefore, the second embodiment is characterized by dividing an input field into plural areas (partial fields) beforehand, and deciding a static area and selecting a reference field by using the divided partial fields.

Next, a picture coding apparatus 600 according to a second embodiment of the present invention is described with reference to diagrams.

Figure 6:
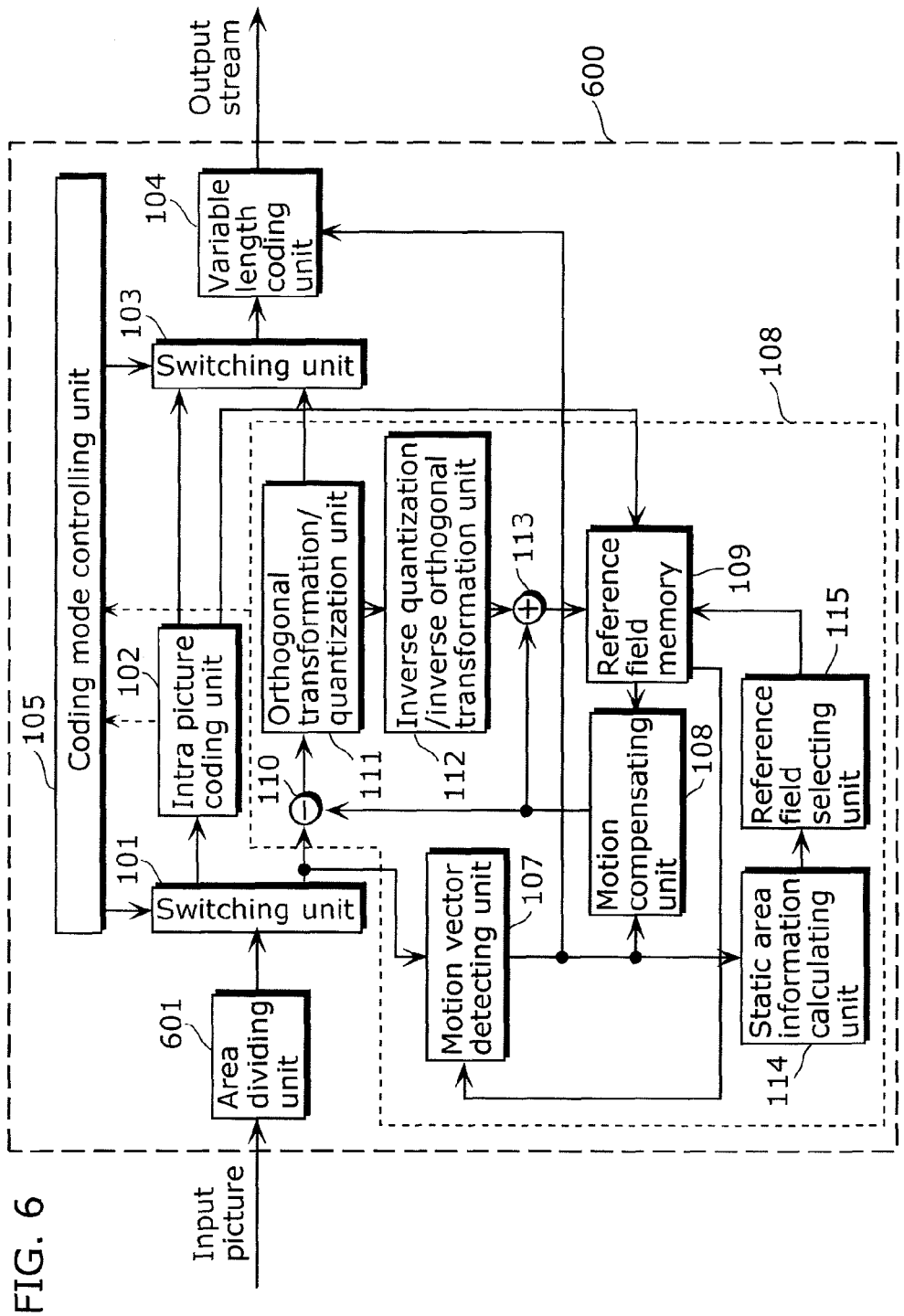
FIG. 6 is a block diagram that shows a picture coding apparatus according to a second embodiment of the present invention.

FIG. 6 is a schematic diagram that shows a structure of the picture coding apparatus 600 according to the second embodiment of the present invention. The picture coding apparatus 600 is structured to include the area dividing unit 601 as a new unit in comparison with the picture coding apparatus 100 in the first embodiment. Any items having the same operation as the ones in the picture coding apparatus 100 have the same number and their detail description is omitted.

The area dividing unit 601 divides an input field into plural partial fields. The way to divide a field done by the area dividing unit 601 can be any kinds of dividing methods such as a method to divide an entire field into areas in the same size, a method to divide an entire field based on a unit stipulated in a certain coding method, and so on. In the second embodiment, a division method that divides a single field such as one shown in FIG. 7 into three partial fields (a partial field A, a partial field B and a partial field C) with a format to divide the field into three equal parts in a vertical direction (a format to divide a field with a division line in a horizontal direction). If coding is conducted by using H.264/AVC standard, the concerned three partial fields are respectively coded as a slice.

It should be noted that, in the picture coding apparatus 600, processes executed by each field in the motion compensating unit 108, the static area information calculating unit 114 and the reference field selecting unit 115 in the picture coding apparatus 100 in the first embodiment are done by each divided area divided by the area dividing unit 601.

Next, a flow for a decision process of a reference field and a summing process of static macroblocks according to the second embodiment of the present invention is described with reference to a flow chart in FIG. 8.

Figure 7:
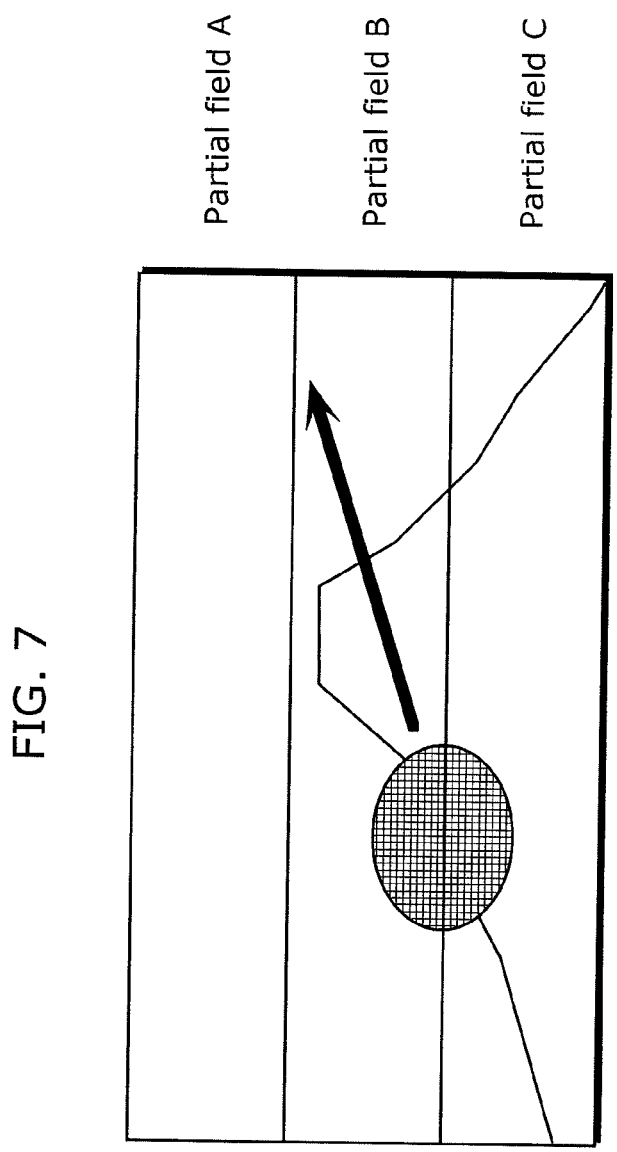
FIG. 7 is a diagram that shows a condition how a field is divided in a plurality of areas.
Figure 8:
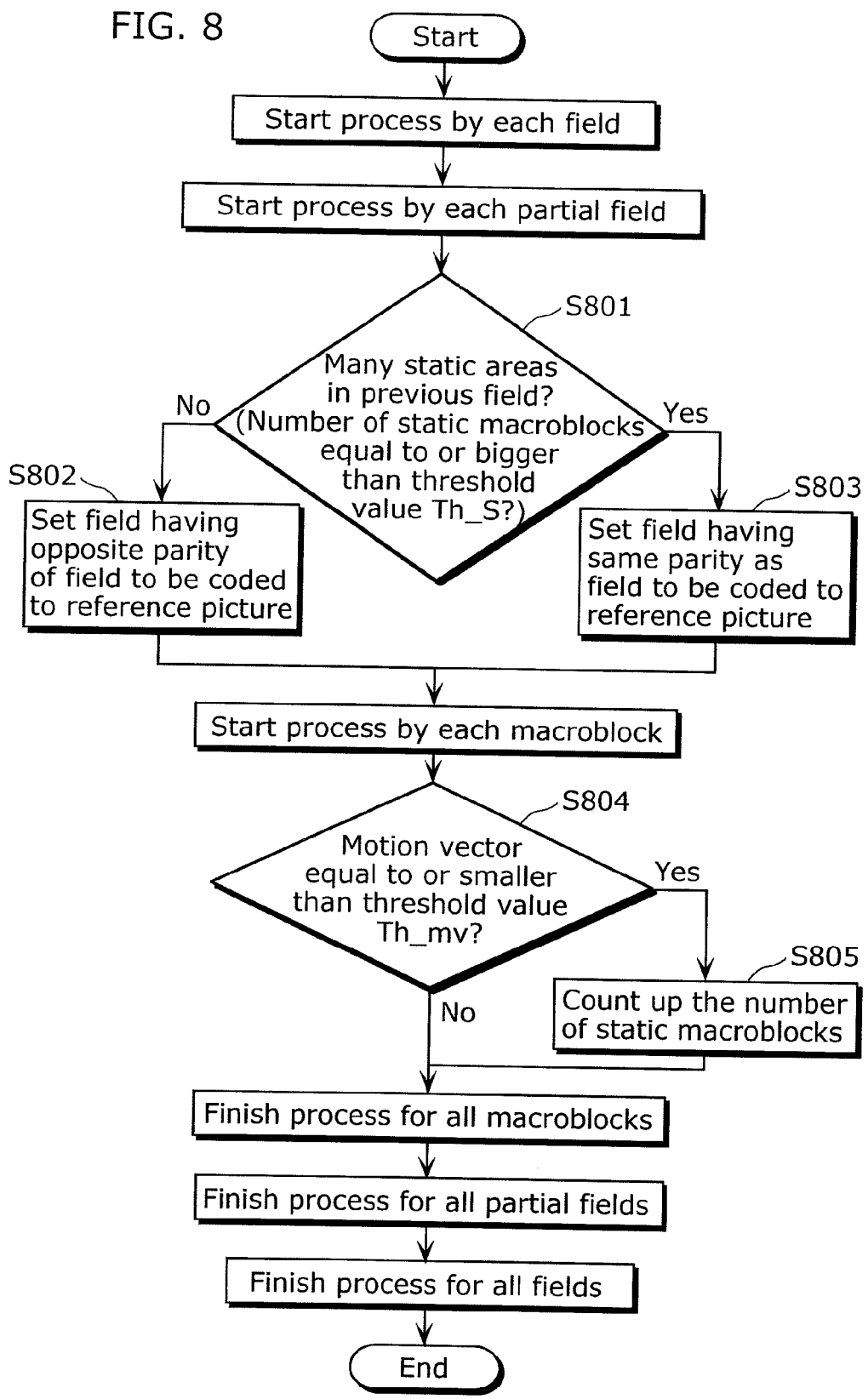
FIG. 8 is a flow chart that shows operation of the picture coding apparatus in the second embodiment.

In the FIG. 8, it is structured to conduct coding from the partial field A, which is indicated in FIG. 7.

First of all, the reference field selecting unit 115 decides a reference field applied to a partial field A, which is a to be coded. At first, it decides if there are many static areas contained in a partial field A to be coded, from whether the number of static macroblocks in the area corresponding to the concerned field A among fields previously coded is bigger than a predetermined value Th_S (S801). If the number of static macroblocks is smaller than the predetermined threshold value Th_S (No in S801), it decides the partial field A is a moving area, meaning that there are not many static areas in the partial field, so that it proceeds to S802. On the other hand, if the number of static macroblocks is bigger than the predetermined threshold value Th_S (Yes in S801), it decides the partial field A is a static area, meaning that there are many static areas in the partial field, so that it proceeds to S803.

If there are not many static areas in the partial field, the reference field selecting unit 115 selects a reference field from fields having the opposite parity of the field to be coded (S802).

On the other hand, if there are many static areas in the partial field, the reference field selecting unit 115 selects a reference field from fields having the same parity as a field to be coded (S803).

Next, the static area information calculating unit 114 calculates the static area information of the concerned field while the field to be coded is coded. This static area information is used to decide a reference field by each partial field by which a following field to be coded is divided.

In short, the static area information calculating unit 114 compares an absolute value of a motion vector estimated by the motion vector estimating unit 107 and a predetermined threshold value Th_mv by each partial field by which a field to be coded is divided (S804).

Next, the static area information calculating unit 114 decides the concerned macroblock as a static macroblock if the motion vector is equal to or smaller than a threshold value Th_mv (Yes in S804). Then, it counts the number of the concerned static macroblock by each partial field (S805). When processes for all of the macroblocks included in the partial field to be coded are completed, the same processes are also executed for the partial fields B and C, and its operation is ended when processes for the entire field are finished.

As mentioned above, the picture coding apparatus 600 according to the second embodiment of the present invention decides a static area by each partial field. By doing so, because the partial field A in the FIG. 7 is composed of the static background, it is decided as static and a reference field is selected from fields having the same parity as the field to be coded. On the other hand, since the partial fields B and C include an object in a big motion, it is decided that they have motions so that a reference field is selected from fields having the opposite parity of the field to be coded. As its result, compared with a case of making a decision based on a field, it can achieve an effect to improve an coding efficiency and picture quality in a field having many static portions.

(Third Embodiment)

In the first and the second embodiments of the present invention, the number of static macroblocks included in the input field is counted, and a reference field is selected according to the number of the concerned static macroblocks. However, if only the number of the static macroblocks for the input field is used, there are cases where an appropriate field is not selected.

Therefore, in the third embodiment, a reference field is decided based on a ratio of a static macroblock included in the input field and macroblocks other than the static macroblock. It is to be noted that the macroblocks other than the static macroblocks may be all of the macroblocks other than the static macroblocks, and they may be dynamic macroblocks of which motion vector estimated in the macroblocks is bigger than a predetermined threshold value. If the dynamic macroblock is used, it achieves an effect to make a more accurate decision for a state of fields to be coded.

Figure 9:
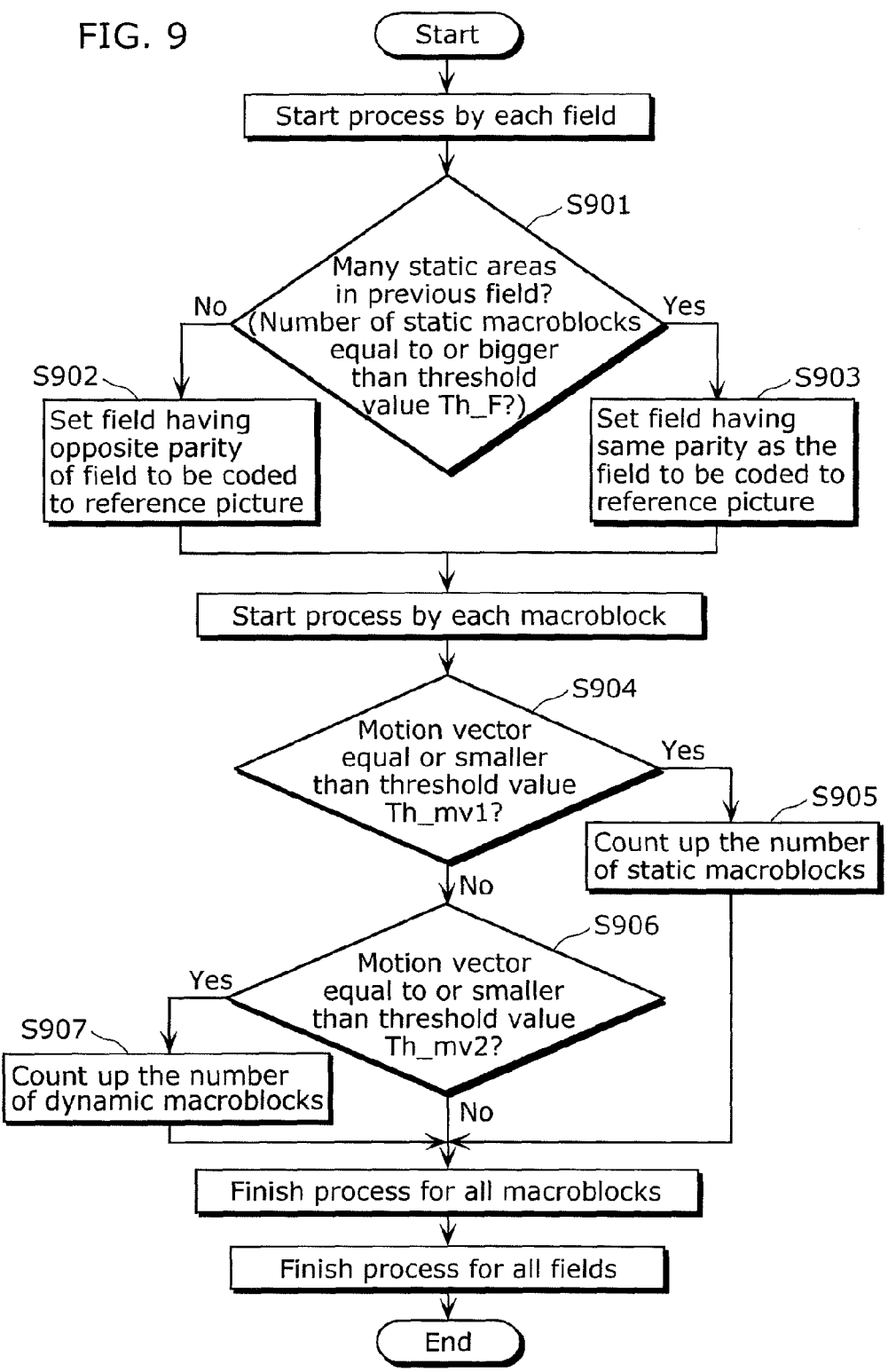
FIG. 9 is a flow chart that shows operation of the picture coding apparatus in the third embodiment.

Next, a picture coding apparatus according to a third embodiment of the present invention is described with reference to FIG. 9.

The picture coding apparatus according to the third embodiment of the present invention has the same structure as the one of the picture coding apparatus 100 in the first embodiment indicated in FIG. 1. Therefore, any items having the same operation as the one in the picture coding apparatus 100 have the same number and their detail description is omitted.

It should be noted that an operation unit, which is different from the ones in the picture coding apparatus 100, is the static area information calculating unit 114. The operation of the static area information calculating unit 114 according to the third embodiment is described with reference to FIG. 9. Processes in S901 to S905 are the same processes in S501 to S505 indicated in FIG. 5. Therefore, their description is omitted.

The static area information calculating unit 114 also counts the number of dynamic macroblocks in addition to the number of static macroblocks. To be more specific, it decides macroblocks of which motion vector is equal to or bigger than a predetermined threshold value Th_mv2 as a dynamic macroblock (Yes in S906), and counts the number of the macroblocks (S907).

Next, the static area information calculating unit 114 outputs a ratio R (MB_S/MB_A) of the number of macroblocks MB_S of the static macroblocks decided as a static area to the number of blocks MB_A of the dynamic macroblocks decided as a dynamic area, as static area information. Then, the reference field selecting unit 115 decides there are many static areas if the ratio R is equal to or smaller than a predetermined threshold value Th_R when a reference field of a subsequent field to be coded is selected. In short, it decides there are many static areas if MB_S/MB_A<Th_R.

As described above, in the static area decision, it decides a size of the static area in the field to be coded based on the ratio R of the number of static macroblocks MB_S to the number of dynamic macroblocks MB_A. Then, by selecting a reference field based on a result of the concerned decision, even in a case there are not many macroblocks for inter picture coding, it is possible to make an accurate static area decision than making a decision only with the number of static macroblocks. As a result of it, compared with a conventional example, it is possible to improve coding efficiency and picture quality.

It should be noted that, although in the first, second and third embodiments, as to inputs fields which are coded as P picture or B picture, inputs are entered to the intra picture coding unit 102 and the inter picture coding unit 106 based on a control signal of the coding mode controlling unit 105, it is acceptable to have a structure that outputs only to either the intra picture coding unit 102 or the inter picture coding unit 106 based on a result that the coding mode controlling unit 105 decides in advance either inter picture coding or inter picture coding for a prediction method applied to each macroblock according to a signal of the macroblock to be coded or a parameter used underway for coding (a volume of generated coding or a QP value, etc.).

In addition, in the first, second and third embodiment, a macroblock of which motion vector is equal to or smaller than a threshold value Th_mv is defined as a static area, however the definition of the static area is not limited to this. For example, instead of the motion vector, it is possible to use a sum of absolute differences in a pixel value between a field to be coded and a reference field. In short, a macroblock of which sum of absolute differences is equal to or smaller than a predetermined threshold value may be defined as a static area. Moreover, if the sum of absolute differences is used, it is not necessary to limit a processing unit to a macroblock only. For example, if a decision for a static area is based on a bigger area than a macroblock, it is possible to speed up the process. On the other hand, if a decision for a static area is based on a smaller area than a macroblock, it is possible to improve a system of a reference field selection.

It is effective to reduce consumed electric power by executing either one of the coding means in a coding apparatus.
(Other Embodiments)

Figure 10:
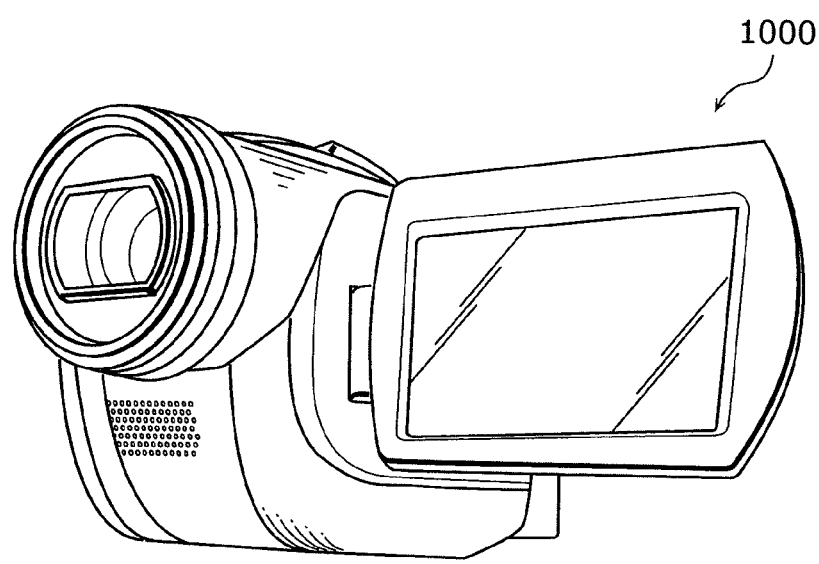
FIG. 10 is a perspective view of a video camera according to an embodiment of the present invention.

The picture coding apparatuses 100, 600 may be applied, for example, to a video camera 1000 indicated in FIG. 10. In short, the video camera 1000 includes an imaging unit that takes a picture in a interlace method, and picture coding apparatuses 100 and 600 that codes the interlaced picture output from the imaging unit. However, the use of the above picture coding apparatuses 100 and 600 is not limited to the video camera 1000. For example, it is also applicable to a picture recording apparatus such as a BD (Blu-ray Disc) recorder, etc.

It should be noted that although the present invention has been described based on the above embodiments, the present invention is not limited to the above embodiments. The following cases are also included in the present invention.

Each apparatus mentioned above is, to be specific, a computer system composed of a micro processor, an ROM, an RAM, a hard disk unit, a display unit, a keyboard, a mouse, and so on. A computer program is stored in a RAM or a hard disk unit. Each apparatus achieves its function by having a microprocessor operate according to the computer program. Here, the computer program is composed of a combination of multiple command codes that sends commands to a computer to achieve a certain function.

A part or all of component elements that composes each of the apparatuses mentioned above may be composed by a single system LSI (Large Scale Integration: Large Scale Integrated Circuit). The system LSI is an ultra-multifunctional LSI manufactured in a way component elements are integrated in a single chip. To be more specific, it is a computer system composed of a microprocessor, ROM, and RAM, etc. A computer program is stored in the RAM. The system LSI achieves its function by having the micro processor operate according to the computer program.

A part or all of component elements that composes each of apparatuses mentioned above may be composed of an IC card or a single module that is attachable and detachable from each of the apparatuses. The IC card or the module is a computer system composed of a microprocessor, a ROM, a RAM and so on. The IC card or the module may include the ultra-multifunctional LSI mentioned above. The IC card or the module achieves its function by having the micro processor operates according to the computer program. This IC card or this module may have tamper proofing.

The present invention may be a method as described above. Also, the present invention may be a computer program that realizes these methods through a computer, or may be a digital signal generated from a computer program.

In addition, the present invention may be a computer program or a digital signal recorded on a computer readable recording medium such as a flexible disk, a hard disk, CD-ROM, a MO, a DVD, a DVD-ROM, a DVD-RAM, a BD (Blu-ray Disk), a semi-conductor memory and so on. Also, it may be a digital signal recorded in these recording media.

Also, the present invention may transmit a computer program or a digital signal via a network, a data broadcasting, etc. represented by an electric communication line, a radio or a wire communication line and an Internet.

Moreover, the present invention may be a computer system that includes a microprocessor and a memory and memorizes the computer program mentioned above in its memory, and the microprocessor operates according to the computer program.

Furthermore, the present invention may be implemented using other independent computer systems by recording and transferring a program or a digital signal in a recording media or transferring a program or a digital signal via a network, etc.

Each of the above embodiments and the above variations may be combined with each other.

Although only some exemplary embodiments of this invention have been described in detail above with reference to the diagrams, this invention is not limited to the embodiments indicated in the diagrams and those skilled in the art will readily appreciate that many modifications and variations are possible in the exemplary embodiments without materially departing from the novel teachings and advantages of this invention. Accordingly, all such modifications and variations are intended to be included within the scope of this invention.
Industrial Applicability The picture coding apparatus and the method according to the present invention are useful for coding, compressing, recording, storing, and transferring moving picture data through a digital camera handling moving pictures, a digital video camera, a mobile phone containing a camera, a DVD/BD recorder, a TV with a program recording capability, a web camera, a program distribution server and so on.

What is claimed is:

1. A picture coding apparatus which codes an interlaced moving picture signal, said picture coding apparatus comprising:
 a non-transitory memory storing computer executable instructions; and
 a processor which executes the computer executable instructions to perform the steps of:
  acquiring motion information on motion in a field to be coded for each of a plurality of areas having at least one pixel included in the field to be coded, the plurality of areas including (i) at least one static area having motion equal to or smaller than a first threshold and (ii) at least one non-static area having motion greater than the first threshold;

acquiring information indicating a ratio of (i) the number of the static areas in the entirety of the field to be coded to (ii) the number of the areas in the entirety of the field to be coded, based on the motion information for each of the plurality of areas included in the field to be coded, the number of the areas in the entirety of the field to be coded including the number of static areas in the entirety of the field to be coded and the number of the non-static areas in the entirety of the field to be coded;

when only one reference field is selected from among fields previously coded, setting the reference field by selectively switching between a top field previously coded and a bottom field previously coded, based on the information indicating the ratio of (i) the number of the static areas in the entirety of the field to be coded to (ii) the number of the areas in the entirety of the field to be coded, the reference field being referred to for the field to be coded; and coding the field to be coded by using the set reference field.

2. The picture coding apparatus according to claim 1, wherein said setting switches between the top field previously coded and the bottom field previously coded so that the reference field has the same parity as the field to be coded when the ratio of (i) the number of the static areas in the entirety of the field to be coded to (ii) the number of the areas in the entirety of the field to be coded is equal to or bigger than a threshold value.

3. The picture coding apparatus according to claim 2, wherein said setting switches between the top field previously coded and the bottom field previously coded so that the reference field has the opposite parity of the field to be coded when the ratio of (i) the number of the static areas in the entirety of the field to be coded to (ii) the number of the areas in the entirety of the field to be coded is smaller than the threshold value.

4. The picture coding apparatus according to claim 1, wherein said setting switches between the top field previously coded and the bottom field previously coded based on information of a field of which temporal distance is closest to the field to be coded.

5. The picture coding apparatus according to claim 1, wherein said setting switches between the top field previously coded and the bottom field previously coded based on information of a field having the same parity as the field to be coded.

6. The picture coding apparatus according to claim 1, wherein said setting switches between the top field previously coded and the bottom field previously coded based on information of a field having the opposite parity of the field to be coded.

7. The picture coding apparatus according to claim 1, wherein the information indicating the ratio of (i) the number of the static areas in the entirety of the field to be coded to (ii) the number of the areas in the entirety of the field to be coded further indicates a ratio of (i) the number of the static areas in the entirety of the field to be coded to (ii) the number of dynamic areas in the entirety of the field to be coded, each of the dynamic areas in the entirety of the field to be coded having motion equal to or greater than a second threshold greater than the first threshold.

8. The picture coding apparatus according to claim 1, wherein the first threshold value is greater as a temporal distance increases between (i) the field to be coded and (ii) the reference field for the field to be coded.

9. The picture coding apparatus according to claim 1, further comprising
wherein said processor further performs a step of dividing divide each field included in the interlaced picture into a plurality of partial fields,
wherein said acquiring information acquires the information indicating the ratio for each of the partial fields of the field to be coded,
wherein said setting switches between the top field previously coded and the bottom field previously coded for each of the partial fields of the field to be coded, and
wherein said coding codes the field to be coded by each of the partial fields.

10. The picture coding apparatus according to claim 9, wherein the partial field is a slice specified in a coding standard.

11. A picture coding method of coding an interlaced moving picture signal, said picture coding method comprising:
acquiring, using a processor, motion information on motion in a field to be coded for each of a plurality of areas having at least one pixel included in the field to be coded, the plurality of areas including (i) at least one static area having motion equal to or smaller than a first threshold and (ii) at least one non-static area having motion greater than the first threshold;
acquiring, using the processor, information indicating a ratio of (i) the number of the static areas in the entirety of the field to be coded to (ii) the number of the areas in the entirety of the field to be coded, based on the motion information for each of the plurality of areas included in the field to be coded, the number of the areas in the entirety of the field to be coded including the number of static areas in the entirety of the field to be coded and the number of the non-static areas in the entirety of the field to be coded;
when only one reference field is selected from among fields previously coded, setting, using the processor, the reference field by selectively switching between a top field previously coded and a bottom field previously coded, based on the information indicating the ratio of (i) the number of the static areas in the entirety of the field to be coded to (ii) the number of the areas in the entirety of the field to be coded, the reference field being referred to for the field to be coded; and
coding, using the processor, the field to be coded by using the set reference field.

12. A video camera which codes an imaged interlaced moving picture signal, said video camera comprising:
a non-transitory memory storing computer executable instructions; and
a processor which executes the computer executable instructions to perform the steps of:
imaging the interlaced moving picture signal;
acquiring, for each of a plurality of fields to be coded included in the interlaced picture, motion information on motion in the field to be coded for each of a plurality of areas having at least one pixel included in the field to be coded, the plurality of areas including (i) at least one static area having motion equal to or smaller than a first threshold and (ii) at least one non-static area having motion greater than the first threshold;
acquiring information indicating a ratio of (i) the number of the static areas in the entirety of the field to be coded to (ii) the number of the areas in the entirety of the field to be coded, based on the motion information for each of the plurality of areas included in the field to be coded, the number of the areas in the entirety of the field to be coded including the number of static areas in the entirety of the field to be coded and the number of the non-static areas in the entirety of the field to be coded;

when only one reference field is selected from among fields previously coded, setting the reference field by selectively switching between a top field previously coded and a bottom field previously coded, based on the information indicating the ratio of (i) the number of the static areas in the entirety of the field to be coded to (ii) the number of the areas in the entirety of the field to be coded, the reference field being referred to for the field to be coded; and coding the field to be coded by using the set reference field.

* * * * *